United States Patent [19]
Yankoff

[11] Patent Number: 4,829,859
[45] Date of Patent: May 16, 1989

[54] METHOD OF HIGH SPEED MACHINING

[75] Inventor: Gerald K. Yankoff, Cincinnati, Ohio

[73] Assignee: Ulticon Systems, Inc., Blue Ash, Ohio

[21] Appl. No.: 902,465

[22] Filed: Aug. 29, 1986

[51] Int. Cl.$^4$ .............................................. B23B 1/00
[52] U.S. Cl. ....................................... 82/1.11; 407/11
[58] Field of Search ............ 82/1 C, DIG. 1; 407/11;
408/56, 57, 59, 60, 61; 409/135, 136; 29/DIG. 89

[56] References Cited

U.S. PATENT DOCUMENTS

| | | | |
|---|---|---|---|
| 1,630,835 | 5/1927 | Doyle | 29/DIG. 89 |
| 2,670,528 | 3/1954 | Brunberg | 82/1 C |
| 2,848,790 | 8/1958 | McMann . | |
| 3,077,802 | 2/1963 | Philip | 407/11 |
| 3,104,826 | 9/1963 | Morris | 407/11 |
| 3,570,332 | 3/1971 | Beake | 407/11 |
| 4,529,340 | 7/1985 | O'Dell | 407/11 |
| 4,621,547 | 11/1986 | Yankoff | 407/11 |

FOREIGN PATENT DOCUMENTS

1047603  10/1983  U.S.S.R. .............................. 407/11
8403239  8/1984  World Int. Prop. O. ............ 407/11

Primary Examiner—Frederick R. Schmidt
Assistant Examiner—Robert Showalter
Attorney, Agent, or Firm—Wood, Herron & Evans

[57] ABSTRACT

A method and apparatus for machining a workpiece with an insert in which a main conduit, such as a pipe, transmits a high velocity stream of water toward a discharge orifice formed in the main conduit. A branch conduit, connected to a source of liquid carbon dioxide, is connected to the main conduit upstream from its discharge orifice and introduces the liquid carbon dioxide into the main conduit for combination with the high velocity stream of water. The pressure within the main conduit is less than that required to maintain the carbon dioxide in liquid phase which causes the liquid carbon dioxide to vaporize and convert the water stream into a high velocity stream including low temperature particles of ice. The ice particles are ejected from the discharge orifice of the main conduit toward the insert where they are converted to a vapor which impacts the workpiece to shear material therefrom in minute particles.

13 Claims, 2 Drawing Sheets

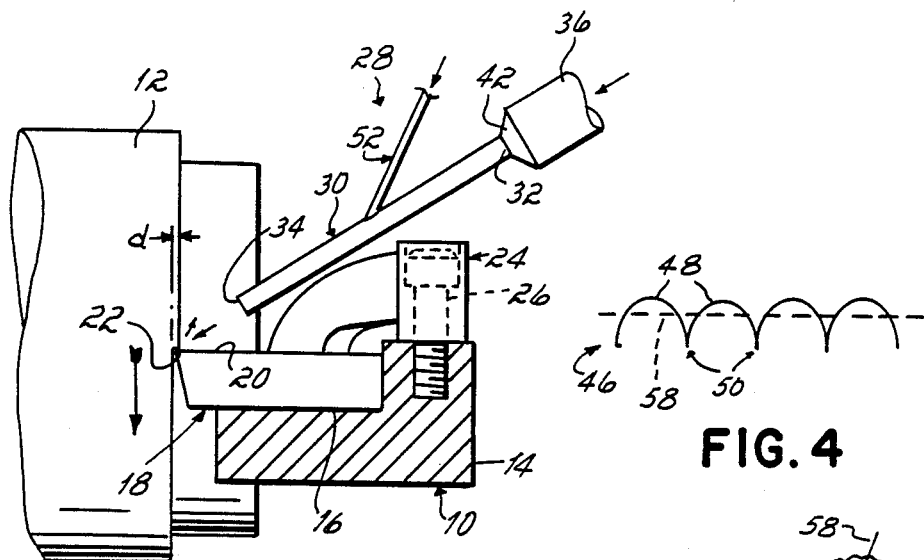
FIG. 2
FIG. 4
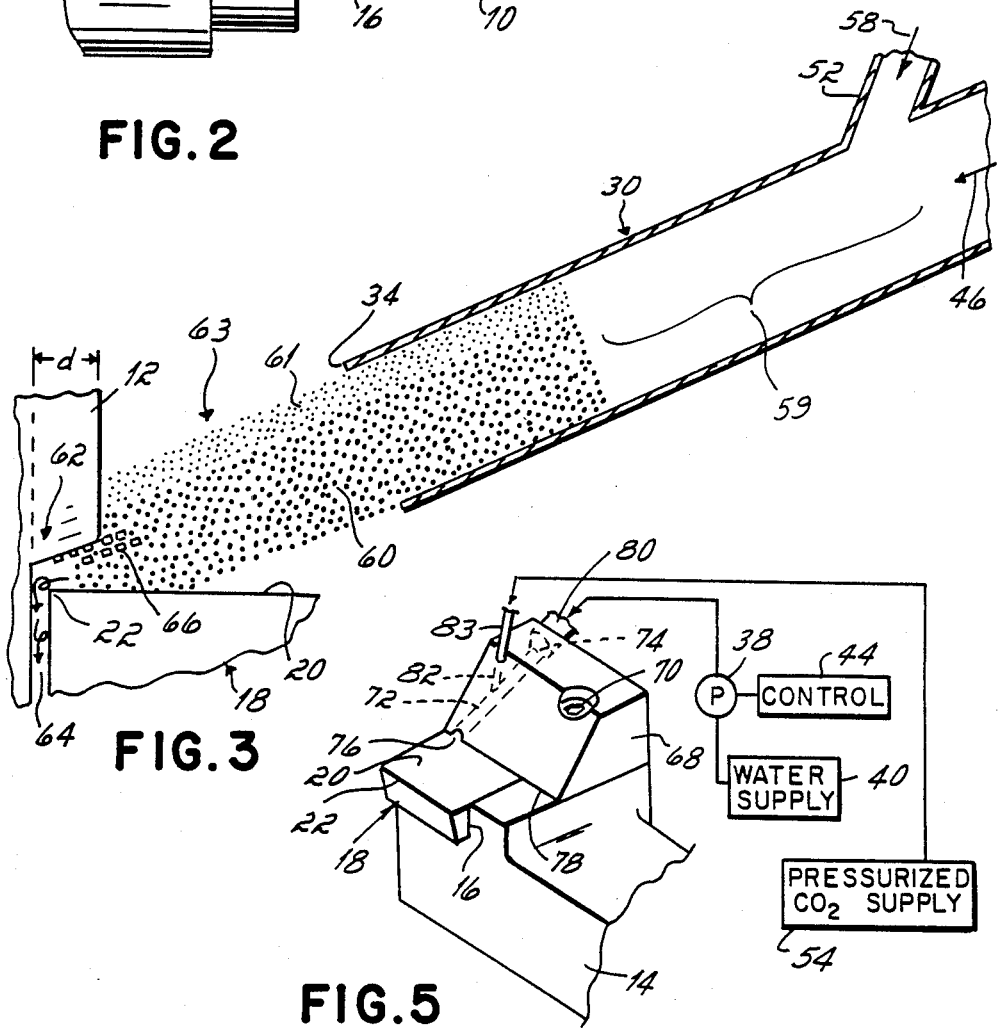
FIG. 3
FIG. 5

4,829,859

METHOD OF HIGH SPEED MACHINING

BACKGROUND OF THE INVENTION

This invention relates to metal working operations such as turning, milling, facing, threading, boring and grooving, and, more particularly, to a method and apparatus for performing such metal working operations at high speeds with extended insert life.

Most machining operations are performed by a cutting tool which includes a holder and one or more cutting inserts each having a top surface terminating with one or more cutting edges. The tool holder is formed with a socket within which the cutting inserts are clamped in place. The leading or cutting edge of an insert makes contact with the workpiece to remove material therefrom in the form of chips. A chip comprises a plurality of thin, generally rectangular-shaped sections of material which slide relative to one another along shear planes as they are separated by the insert from the workpiece. This shearing movement of the thin sections of material relative to one another in forming a chip generates a substantial amount of heat, which, when combined with the heat produced by engagement of the cutting edge of the insert with the workpiece can amount to 1500°–2000° F.

Among the causes of failure of the cutting inserts of tool holders employed in prior art machining operations are abrasion between the cutting insert and workpiece, and a problem known as cratering. Cratering results from the intense heat developed in the formation of the chips and the frictional engagement of the chips with the cutting insert.

As the material forming the chip is sheared from the workpiece, it moves along at least a portion of the exposed top surface of the insert. Due to such frictional engagement, and the intense heat generate in the formation of the chip material along the top portion of the insert is removed forming "craters". If these craters become deep enough, the entire insert is subject to cracking and failure along its cutting edge, and along the sides of the insert, upon contact with the workpiece. Cratering has become a particular problem in recent years due to the development and extensive use of hard alloy steels, high strength plastics and composite materials formed of high tensile strength fibers coated with a rigid matrix material such as epoxy.

Prior attempts to avoid cratering and wear of the insert due to abrasion with the workpiece have provided only modest increases in tool life and efficiency. One approaching the prior art has been to form inserts of high strength materials such as tungsten carbide. Although extremely hard, tungsten carbide inserts are brittle and are subject to chipping which results in premature failure. To improve the lubricity of inserts, such materials as hardened or alloyed ceramics have been employed in the fabrication of cutting inserts. Additionally, a variety of low friction coatings have been developed for cutting inserts to reduce the friction between the cutting insert and workpiece.

In addition to the improved materials and coatings used in the manufacture of cutting inserts, attempts have been made to increase tool life by reducing the temperature in the "cutting area", i.e., the cutting edge of the insert, the insert-workpiece interface and the area on the workpiece where material is sheared to form chips.

One method of cooling practiced in the prior art is flood cooling which involves the spraying of a low pressure stream of coolant toward the cutting area. Typically, a nozzle disposed several inches above the cutting tool and workpiece directs a low pressure stream of coolant toward the workpiece, tool holder, cutting insert and on top of the chips being produced.

The primary problem with flood cooling is that it is ineffective in actually reaching the cutting area. The underside of the chip which makes contact with the exposed top surface of the cutting insert, the cutting edge of the insert and the area where material is sheared from the workpiece, are not cooled by a low pressure stream of coolant directed from above the tool holder and onto the top surface of the chips. This is because the heat in the cutting area is so intense that a heat barrier is produced which vaporizes the coolant well before it can flow near the cutting edge of the insert.

Several attempts have been made in the prior art to improve upon the flood cooling technique described above. For example, the discharge orifice of the nozzle carrying the coolant was placed closer to the insert and workpiece, and/or fabricated as an integral portion of the tool holder, to eject the coolant more directly at the cutting area. See, for example, U.S. Pat. Nos. 1,695,955; 3,323,195; and 3,364,800. In addition to positioning the nozzle nearer to the insert and workpiece, the stream of coolant was ejected at higher pressures than typical flood cooling applications in an effort to break through the heat barrier developed in the cutting area. See U.S. Pat. No. 2,653,517.

Other tool holders for various types of cutting operations were designed to incorporate coolant delivery passageways which direct the coolant flow across the exposed top surface of the insert toward the cutting edge in contact with the workpiece. In these designs, a separate conduit or nozzle for spraying the coolant toward the cutting area was eliminated making the cutting tool more compact. Examples of this type of design are shown in U.S. Pat. Nos. 4,302,135; 4,072,438; 3,176,330; 3,002,140; 2,360,385; and, West German Patent No. 3,004,166.

A common problem with the apparatus disclosed in the patents mentioned above is that coolant in the form of an oil-water or synthetic mixture, at ambient temperature, is directed across the top surface of the insert toward the cutting area without sufficient velocity to pierce the heat barrier surrounding the cutting area. As a result, the coolant failed to reach the interface between the cutting insert and workpiece and/or the area on the workpiece where the chips are being formed before becoming vaporized. Under these circumstances, no heat was dissipated from the cutting area to prevent cratering. In addition, this failure to remove heat from the cutting area created a significant temperature differential between the cutting edge of the insert which remained hot, and the rear portion of the insert which was cooled by coolant, causing thermal failure of the insert.

The failure in the prior art to effectively reduce temperature in the cutting area results in a number of disadvantages and limitations in machining operations. As discussed above, high temperatures cause insert failure. This directly affects production speed in several ways. In order to reduce temperatures, the machine tools must be run at lower speeds and at reduced depths of cut and feed rates which lowers productivity. If speeds are increased, the downtime of the machine tool increases because the inserts must be replaced more frequently. The less time the insert is in the cut, the lower the productivity of a given machine tool. Overall productivity is therefore limited by the useful life and performance of the cutting inserts which have historically lagged far behind the operating speeds of machine tools.

Another serious problem in present day machining operations involves the breakage and removal of chips from the area of the cutting insert, tool holder an the chucks which mount the workpiece and tool holder. If chips are formed in continuous lengths, they tend to wrap around the tool holder or chucks which almost always leads to tool failure or at least requires a periodic interruption of the machining operation to clear the area of impacted or bundled chips. This is particularly disadvantageous in flexible manufacturing systems in which the entire machining operation iis intended to be completely automated. Flexible manufacturing systems are designed to operate without human assistance and it substantially limits their efficiency if a worker must regularly clear impacted or bundled chips.

Current attempts to solve the problem of removal and breakage of chips are limited to various designs of chip breaker grooves in cutting inserts. Chip breaker grooves extend inwardly from the exposed top surface of the insert, and are spaced from the cutting edge. The chip breaker grooves engage the chips as they are sheared by the cutting edge from the workpiece, and then turn or bend them upwardly from the exposed surface of the insert so that the chips tend to fracture.

While acceptable performance has been achieved with some chip breaker groove designs in some applications, variables in machining operations such as differing materials, types of machines, depths of cut, feed rates and speeds make it virtually impossible for one chip breaker groove design to be effective in all applications. This is evidenced by the multitude of chip breaker designs now available. Selection of a suitable cutting insert for a particular machining application, if one exists at all, is a difficult and continuing problem.

SUMMARY OF THE INVENTION

It is therefore among the objectives of this invention to provide a method and apparatus of machining in which the temperature is reduced in the area where material is removed from the workpiece, which increases the life of cutting inserts, which eliminates the formation of elongated chips, which permits machining operations to be run at extremely high speeds, which produces a good surface finish and surface integrity on the workpiece and which lowers the horsepower requirements of the machine tool in making a cut on a workpiece.

These objectives are accomplished in a method of machining which, in a presently preferred embodiment, is adapted for use with a conventional tool holder having a cutting insert formed with a cutting edge. The method comprises directing a high velocity stream including low temperature fluid particles in solid phase, such as ice crystals, toward the cutting edge of the insert mounted within the tool holder. The cutting edge of the insert is permitted to contact the workpiece at the initial stage of the cut to begin to shear material therefrom, which produces heat. The heat produced by shearing material from the workpiece is transferred from the workpiece to the low temperature ice particles which converts the ice particles from solid phase to vapor phase. In the course of vaporization, the ice particles undergo an explosive, volumetric expansion thus producing a force which both shears material from the workpiece without any further aid from the insert, and which also breaks or shatters the material being removed into minute particles.

In a presently preferred embodiment of this invention, the apparatus for practicing the method described above comprises a conduit such as a stainless steel pipe having a discharge outlet and an inlet. The inlet is connected to a delivery line from a source of water which includes a high pressure pump whose operation is controlled by a computer or other closed loop feedback system. The conduit is mounted upon the tool holder, or adjacent thereto, such that the discharge outlet is aimed at the cutting edge of the insert. A branch line is connected to the conduit between its inlet and outlet which communicates with a tank of liquid carbon dioxide under high pressure.

The computer is operable to control the water pump so that a pulsating stream of water is introduced in the conduit through its inlet, preferably at a velocity of about 1,000 fee per second. The pulses in the stream of water supplied by the pump are pressure surges, provided at regular intervals, which vary the pressure of the water stream from a peak of about 5,000 psi to a trough or valley of about 2,000 psi or lower. A stream of liquid carbon dioxide is introduced from the tank at the top of the main conduit through the branch line at a substantially constant pressure which is lower than the peak pressure of the pulsating water stream but greater than the pressure in the valleys between pressure surges. As a result, the stream of liquid carbon dioxide is combined or interlaced with the pulsating water stream at the lower pressure valleys between pressure surges. The pressure o the water stream in such valleys between pressure surges is less than that required to maintain the liquid carbon dioxide in liquid phase, and it therefore vaporizes within the main conduit upstream from the discharge orifice thereof.

Vaporization of the liquid carbon dioxide has two effects upon the stream of water. First, the heat of vaporization required to convert the liquid carbon dioxide to the vapor state reduces the temperature of the water stream to such an extent that it crystallizes in solid phase, i.e., forms minute ice crystals. A temperature gradient is formed in the stream of ice crystals formed in the main conduit where the temperature of the ice crystals progressively increases from the upper portion of the main conduit where the branch line is connected, to the lower portion of the main conduit along a line or plane perpendicular to the axis of the main conduit. At the top portion of the main conduit where the liquid carbon dioxide is introduced and directly contacts the stream of water, the temperature of the ice crystals formed is lowered rapidly to a range of about $-100°$ to $-200°$ F. The temperature of the ice crystals then progressively increases moving further from the liquid carbon dioxide toward the opposite side of the main conduit so that the ice crystals formed along the bottom portion of the main conduit have a temperature of about $0°$ F.

In the course of vaporization, the liquid carbon dioxide undergoes a substantial volumetric expansion which also has an affect on the stream of water. The force produced by such volumetric expansion is directed outwardly through the discharge outlet of the conduit since radial expansion is confined by the walls of the conduit and movement upstream along the conduit is blocked by the flow of the high velocity water stream. As a result, a substantial portion of the stream of ice particles being formed within the conduit are accelerated and ejected from the discharge outlet of the conduit, preferably at a velocity on the order of about 2,000 feet per second.

It is estimated that the temperature in the cutting area, i.e., the area where material is sheared from the workpiece, is on the order of 2,000° F. or higher for many materials and machining conditions. The high velocity, low temperature stream of ice particles is ejected from the discharge outlet of the conduit toward this cutting area so that the very low temperature particles at −100° to −200° F. are directed above the cutting edge and top surface of the insert and the higher temperature particles at about 0° F. are directed across the top surface of the insert. Ice particles at a temperature of about −200° F. are thus suddenly exposed to heat in the cutting area of up to 2,000° F., and ice particles at a temperature of about 0° F. are exposed to the cutting insert. The result is an explosive vaporization of the very low temperature ice particles as they are converted from solid phase and to vapor phase, while the cutting insert and tool holder are protected by exposure to the particles at a temperature of only about 0° F. which are not cold enough to cause thermal failure of the insert or tool holder.

In one aspect of such vaporization, heat is transmitted from the workpiece in order to convert the ice particles, at temperatures in the range of 0° to −200° F., to a vapor. Because of the extremely cold temperatures at which the ice particles are introduced to the cutting area, a substantial amount o the heat produced in shearing material from the workpiece is removed from the workpiece in order to vaporize the ice particles. As a result, failures resulting from high temperatures, such as cratering, are reduced and the useful life of a cutting insert is increased.

Another aspect of the vaporization of the low temperature particle stream is also believed to contribute to extending insert life. It is presently believed that at least a portion of the low temperature ice particles are converted from solid phase to a liquid-gaseous phase stream in the area of the cutting edge of the insert. This liquid-gaseous stream is directed between the cutting edge of the insert and workpiece forming a thin film which prevents the cutting edge from contacting the workpiece except at the initial stage of the cut. As discussed below, shearing of material from the workpiece is therefore achieved not by contact of the insert with the workpiece, except for the initial stages of the cut, but by the force of the expanding gas produced in vaporizing the particle stream.

This liquid barrier also helps protect the insert against wear by contact with the workpiece due to a problem known as "chattering". Chattering is created by movement of the workpiece with respect to the tool holder as the workpiece or tool holder is rotated by the machine tool. Impact between the workpiece and insert due to chattering can result in premature failure of the inserts, but the liquid barrier or film formed between the workpiece and insert herein reduces the force of such impact and therefore lessens the chance of insert failure due to chattering.

Another aspect of introducing high velocity, low temperature ice crystals or particles into the cutting area relates to the removal of material from the workpiece per se. The sudden conversion of extremely low temperature ice particles from solid to vapor phase produces an explosive volumetric expansion of the ice particles fluid stream. The force created by such volumetric expansion s useful in several respects.

In the initial stage of a cut, the cutting edge of the insert contacts the workpiece and begins to shear material therefrom which produces heat. The coldest or top portion of the particle stream is then directed above the cutting edge of the insert to the location where the material is being sheared from the workpiece. The explosive, volumetric expansion of the ice particles which undergo vaporization thereat produces a force which engages the material initially being sheared by the insert, removing it from the workpiece. In continuing the cut, it is believed that the force of the expanding gas thereafter provides substantially the entire force required to shear material from the workpiece with little or no assistance from the insert.

This has several advantages. First, closer tolerances can be maintained in the cut because little force, if any, has to be exerted by the insert in shearing the material from the workpiece. Additionally, for most machining operations, the energy or horsepower required to advance the tool holder relative to the workpiece is substantially reduced regardless of the type of material machined. This is because the insert does not exert the force required to shear the material from the workpiece, and therefore less horsepower is required to move the insert radially inwardly and/or longitudinally along the workpiece to make the cut.

The explosive, volumetric expansion of the ice particles also has a dramatic affect on the form of the material removed from the workpiece. Regardless of the type of material to be cut, e.g., metal, plastic, composite, etc., no "chips" are formed as the term is commonly understood in the machining industry. In the prior art, chips are thin sections of material resembling wood shavings which can be of a length ranging from less than an inch to a continuous length. The explosive force applied to the material sheared from the workpiece eliminates "chips" and instead breaks up the material at a molecular level and forms minute particles or granules. The elimination of chips is a significant improvement over the prior art, and is particularly advantageous in fully automated flexible manufacturing systems.

In an alternative embodiment of the apparatus herein, a socket is formed in the tool holder which receives the insert so that the top surface of the insert is exposed. The insert is secured within the socket by a clamp which extends along the exposed, top surface of the insert to a point spaced from the cutting edge thereof. Preferably, the clamp is removably secured to the tool holder by a screw or other means.

In this embodiment, a main passageway for transmitting water is formed i the clamp which terminates at a discharge orifice located atop the top surface of the insert. A second passageway is formed in the clamp, for delivery of the liquid carbon dioxide, which intersects the main passageway at a point upstream from the discharge orifice. The process of forming the high velocity stream including low temperature ice crystals, and directing such stream to the cutting edge of the insert, is identical to that described above.

DESCRIPTION OF THE DRAWINGS

The structure, operation and advantages of a presently preferred embodiment of this invention will become further apparent upon consideration of the following description taken in conjunction with the accompanying drawings, wherein:

FIG. 2 is an enlarged side view of the apparatus illustrated in FIG. 1;

FIG. 3 is a enlarged side view, in partial cross section, of a portion of FIG. 2;

FIG. 4 is a schematic view of a graph showing the combination of the pulsating water stream and constant pressure liquid carbon dioxide stream, and FIG. 5 is an alternative embodiment of the apparatus of this invention.

DETAILED DESCRIPTION OF THE INVENTION

Figure 1:
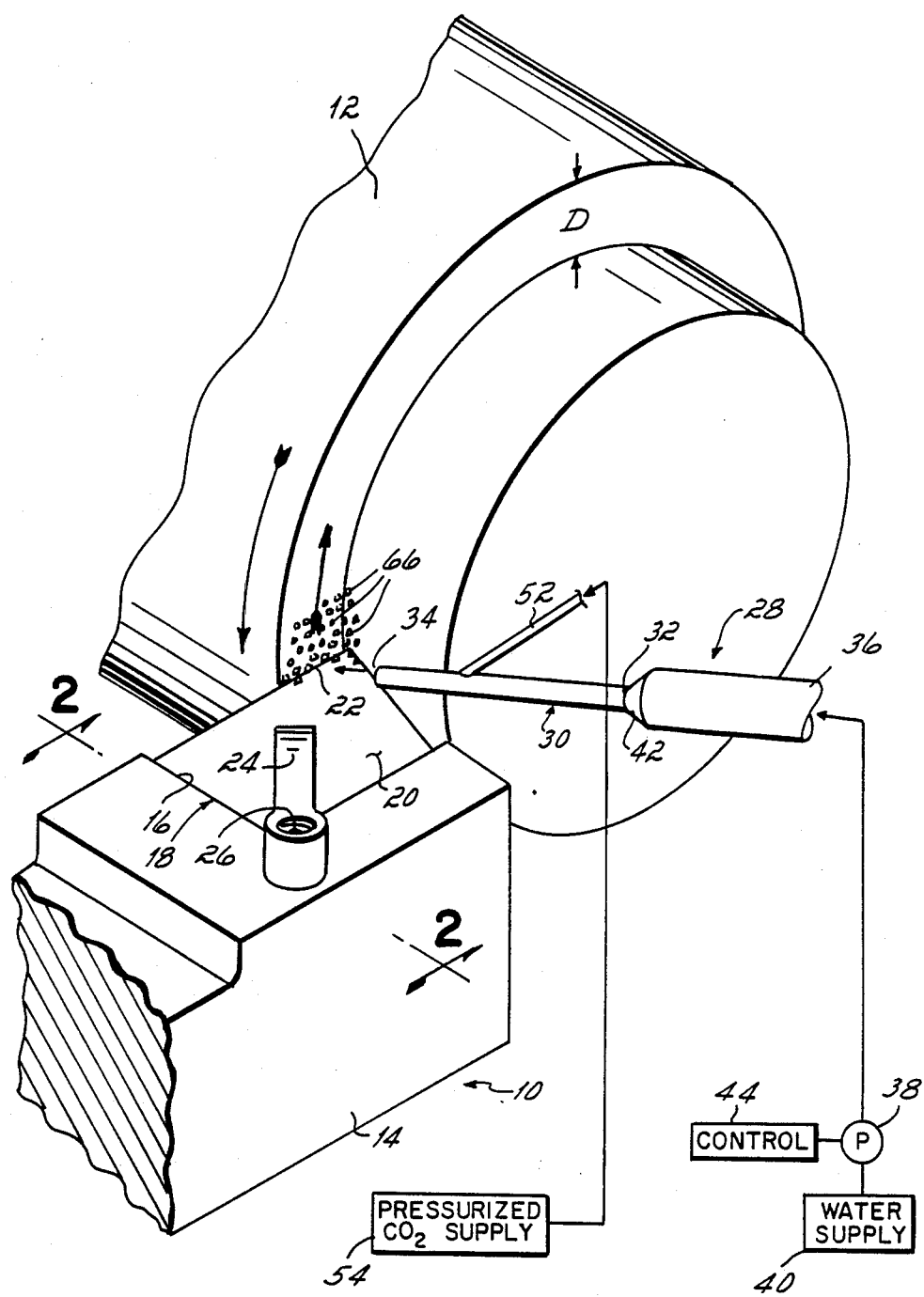
FIG. 1 is a partial perspective view of a tool holder with a cutting insert in which the machining apparatus of this invention is employed.

Referring now too the drawings, a standard tool holder 10 for a turning operation is illustrated in position to make a cut on a workpiece 12. The workpiece 12 is mounted in a chuck of a machine tool (not shown) which is adapted to rotate the workpiece 12 in the direction of the arrow indicated in FIG. 1. The tool holder 10 includes a support bar 14 formed with a socket 16 which receives a cutting insert 18 having an exposed top surface 20 terminating in a cutting edge 22. The insert 18 is clamped withnn the socket 16 by a U-shaped clamp 24 which is removably mounted to the support bar 14 of the tool holder 10 by a screw 26.

As illustrated in FIGS. 1 and 2, the tool holder 10 is positioned with respect to the workpiece 12 at a given depth of cut "D". The depth of cut D is exaggerated in the drawings for purposes of illustration. The feed rate is expressed as the distance in inches, "d", which the tool holder 10 advances longitudinally along the workpiece 12 for each revolution of the workpiece 12. The workpiece 12 can be made of a variety of materials such as metal, plastic, composite and others.

Referring now to FIGS. 1 and 2, a presently preferred embodiment of the machining apparatus 28 is illustrated. The machining apparatus 28 comprises a main conduit 30 having an inlet 32 at one end and a discharge outlet 34 at the other end. Preferably, the main conduit 30 is a pipe formed of stainless steel or other rust resistant material. The inlet 32 of the main conduit 30 is connected to a delivery line 36 from a pump 38 connected to a source of water illustrated schematically at 40 in the drawings. The diameter of the delivery line 36 is about twice that of the main conduit 30 and tapers inwardly forming a neck 42 at its connection to the inlet 32 of main conduit 30.

The operation of pump 38 is controlled by a computer or other closed loop feedback device illustrated schematically at 44 in FIG. 1. The computer 44 is operable to control pump 38 so that a pulsating stream of water 46 at a rate of about 1 to 10 grams per minute is directed through the delivery line 36 to the inlet 30 of main conduit 32. The water is accelerated upon entering the smaller diameter main conduit 30 through the tapered neck 42 to a velocity preferably of about 1,000 feet per second. As illustrated in FIG. 4, the pulses in the stream of water 46 supplied by the pump 38 are pressure surges at regular intervals which vary the pressure of the stream 46 from peaks 48 of about 5,000 psi to troughs or valleys 50 of about 2,000 psi or lower.

A branch conduit 52, in the form of a pipe made of stainless steel or other rust resistant material, is connected to the top portion of main conduit 30 between its inlet 32 and discharge outlet 34. The branch conduit 52 communicates with a tank of liquid carbon dioxide pressurized to approximately 800 psi which is illustrated schematically at 54 in the drawings. The tank 54 is operable to pump a stream 58 of liquid carbon dioxide, illustrated in broken lines in FIG. 4, through the branch conduit 42 at a flow rate of about 10-20% of the flow rate of the water stream 46 and at a constant pressure.

As illustrated in FIG. 4, the stream 58 of liquid carbon dioxide is ejected into the main conduit 30 at a pressure which is lower than the highest pressure of the pulsating water stream 46 at the peak 48 but greater than the pressure of the water stream 46 at the valleys 50 or areas of lower pressure. This allows the liquid carbon dioxide stream 58 to combine or interlace with the water stream 46 at the high velocity at which the water flows through main conduit 30. It is believed the water stream 46 and carbon dioxide stream 58 combine along a mixing or interleaving area 59 within conduit 30 as schematically shown in FIG. 3.

In a presently preferred embodiment, the pressure of the water stream 46 at its valleys 50 is less than that required to maintain the liquid carbon dioxide stream 58 in liquid phase. As a result, the liquid carbon dioxide undergoes vaporization within the conduit 30 which requires energy. This energy is provided in the form of heat which is drawn primarily from the water stream 46, and to a lesser extent from the walls of main conduit 30 and the ambient air.

Referring now to FIG. 3, heat transfer between the vaporizing liquid carbon dioxide and water stream 46 takes place first near the top portion of the water stream 46 beneath the branch line 52 where the liquid carbon dioxide is introduced. The water at this location is converted from liquid phase to solid phase before exiting the discharge outlet 34 of the conduit 30, forming minute ice crystals or particles 60 having a temperature which is estimated to be in the range of about −100° to −200° F. The heat transfer between the remainder of the water stream 46 and liquid carbon dioxide progressively lessens in moving further away from the branch line 52 so that the water near the bottom portion of main conduit 30 is converted to ice particles 60 having a temperature which is estimated to be about 0° F. A temperature gradient is therefore created in the ice particles 60 formed within main conduit 30 in which the temperature of the ice particles 60 decreases from about 0° F. near the bottom portion of main conduit 30 to a temperature of about −200° F. at the top portion of main conduit 30 nearest the branch conduit 52.

Conversion of the liquid carbon dioxide to vapor phase within the main conduit 30 also increases the velocity of the ice particles 60. In converting from liquid to vapor phase, the liquid carbon dioxide undergoes a sudden, explosive volumetric expansion within the main conduit 30. Radial expansion of the carbon dioxide gas is prevented by the walls of the main conduit 30, and the high velocity water stream prevents the carbon dioxide gas from moving upstream within the main conduit 30. The only unrestricted path for the expanding, vaporized carbon dioxide is downstream through the open discharge outlet 34. As a result, a substantial force is exerted on the ice particles 60 being formed within the main conduit 30 which accelerates and ejects them from the discharge outlet 34 in a stream 63 at a velocity of approximately 2,000 feet per second. As illustrated in FIG. 3, a relatively small portion of the stream 63 ejected from discharge outlet 34 also includes carbon dioxide gas 61.

The location at which material is sheared from tee workpiece 12 is designated as the "cutting area" 62 in the drawings for purposes of discussion. Substantial heat is produced upon shearing of material from the workpiece 12. Depending upon such factors as the feed rate, speed, type of insert and workpiece material, the heat in the cutting area can be 2,000° F. or higher.

As illustrated in FIGS. 1 and 2, the discharge outlet 34 of main conduit 30 is aimed directly at the cutting area 62. The distance between the discharge orifice 34 and cutting edge 22 of insert 18 is not critical, although it is contemplated in most applications such spacing is approximately one inch. The stream 63 including ice particles 60 is therefore ejected from the discharge orifice 34 toward the high temperature cutting area 62 and cutting edge 22 of insert 18 at a velocity of approximately 2,000 feet per second and at a temperature gradient ranging from about 0° F. to about −200° F.

In beginning a cut on workpiece 12, the cutting edge 22 of insert 18 is initially permitted to make contact with the workpiece 12 to shear material therefrom producing substantial heat at the workpiece 12 which is transferred at least to some degree to the insert 18. The high velocity, extremely low temperature stream of ice particles 60 is then directed toward the workpiece 12 and insert 18 so that the coldest particles 60 having a temperature of about −200° F. are concentrated in the area above the top surface 20 and cutting edge 22 of the insert 18 where material is being sheared from the workpiece 12, and the higher temperature particles 60 of about 0° F. are concentrated across the top surface 20 and cutting edge 22 of insert 18. Exposed to the extremely high temperature in the cutting area 62, a substantial portion of the ice particles 60 including the coldest particles 60 at the top portion of the stream are essentially instantaneously converted from solid phase to vapor phase. This requires a substantial amount of energy in the form of heat which comes primarily from the workpiece 12 and to a lesser extent from the insert 18 at least initially when the cutting begins. As result, substantial cooling of both the insert 18 and workpiece 12 is achieved, which greatly adds to the useful life of the insert 18.

The concentration of higher temperature particles 60 of about 0° F. at the lower portion of the particle stream across the top surface 20 of the insert 18 is advantageous in preventing thermal failure of the insert 18 and/or holder 14. Thermal failure can occur in tungsten carbide and other materials used to form inserts where the inserts are subjected to an extreme temperature differential from one end to another. As mentioned above, at least in the initial stage of the cut the cutting edge 22 of insert 18 contacts the workpiece 12 and becomes heated due to the transfer of heat from the material sheared from workpiece 12. If extremely low temperature ice particles 60 contacted the insert 18, e.g., the coldest particles in the stream at temperatures of −200° F., the temperature differential between the cutting edge 22 and the remainder of insert 18 would produce a thermal shock which could shatter the insert 18. By concentrating the higher temperature particles 60 of about 0° F. at the bottom portion of the particle stream which contacts the insert 18, thermal failure of insert 18 is prevented.

The insert 18 is also protected from failure and wear by the method and apparatus herein in another respect. It is presently believed that in the course of vaporization of ice particles 60, at least a portion of the particles 60 is converted from ice crystals to a liquid-gaseous phase stream in the area of the cutting edge 22 of insert 18. This liquid-gaseous stream is directed between the cutting edge 22 of the insert 18 and the workpiece 12 forming a thin film 64 which prevents the cutting edge 22 from contacting the workpiece 12 except at the initial stage of the cut. This further protects the insert 18 and greatly extends its useful life.

It is presently believed that shearing of the material from the workpiece 12, except at the initial stage of the cut, is achieved not by contact of the insert 18 with the workpiece 12 but by the volumetric expansion of the ice particles 60 in converting from solid to vapor. Initially, the cut is begun by engagement of the cutting edge 22 of insert 18 with the workpiece 12 to shear material therefrom which produces heat. The stream of particles 60 is then introduced to the cutting area 50 which is vaporized by the heat produced in the initial stage of the cut. The force produced by this violent, volumetric expansion of the particles 60 to vapor phase then impacts the workpiece 12 above the insert 18 and shears material therefrom without contact between the insert 18 and workpiece 12. This, in turn, produces heat which is transferred to the particles 60 which follow in the continuous stream.

As the cut continues, it is believed that the expanding gas thereafter provides substantially the entire force required to shear material from the workpiece 12. This greatly reduces the energy or horsepower at which the machine tool supporting the holder 14 must be run to advance the insert 18 along the workpiece 12 at a given feed rate and depth of cut. Good surface integrity and finish on the workpiece is also achieved because the velocity and flow rate at which the water stream 46 and liquid carbon dioxide stream 58 are introduced into main conduit 30 are accurately controlled so that the depth of cut produced by vaporization of the stream of ice particles 60 made therefrom is constant and repeatable throughout a production run.

The volume occupied by the minute ice particles 60 is negligible compared to the volume of the steam and carbon dioxide gas produced by vaporization of the ice particles 60. The volumetric expansion of the ice particles 60 in converting from solid to vapor phase is sudden and explosive because of the extreme temperature differential between the ice particles 60 and cutting area 50, and the high velocity at which the ice particles 60 are directed into the cutting area 50.

The force produced by the violent, volumetric expansion of the ice particles 60 also affects the form of the material removed from the workpiece 12. In effect, the material is shattered or blown apart by the force of the expanding gas forming particles or granules 66 of material. See FIG. 1. In addition, it is believed that the heat removed from the workpiece 12 and the material sheared therefrom, in order to vaporize the ice particles 60, also contributes to the formation of the granules 66. This is because the sudden cooling of the workpiece 12 is believed to cause embrittlement of the material or a separation of the atomic structure of the material at a molecular level, which, when impacted by the force of the expanding gas, breaks the material apart into minute granules 66. No "chips" in the conventional sense of the word, i.e., an elongated, thin section of material sheared from the workpiece 12, are thus produced in the method of this invention. The result is an essentially chipless machining operation.

Referring now to FIG. 3, an alternative embodiment of this invention is illustrated. In this embodiment, a clamp 68 is employed in the tool holder 10 described above. The clamp 68 is secured to the support bar 14 of the tool holder 10 by a screw 70 and rests atop a substantial portion of the exposed top surface 20 of the insert 18 to clamp it in place within socket 16. The clamp 54 is formed with a main internal passageway 72 having an inlet 74 and a discharge orifice 76 located at the forward edge 78 of the clamp 68 atop the exposed top surface 20 of insert 18. The inlet 74 of main internal passageway 72 is connected to a delivery line 80, which, in turn, is connected to a pump 38 and controller 44 as described above.

A branch internal passageway 82 is formed in the clamp 68 which intersects the main internal passageway 72 between its inlet 74 and discharge orifice 76. The branch internal passageway 82 is connected by a line 83 to a tank of pressurized liquid carbon dioxide illustrated schematically at 84. The liquid carbon dioxide from branch internal passageway 82, and the stream of water within the main internal passageway 72, are combined internally of the clamp 68 in the same manner as the embodiment previously described to produce a stream including ice particles (not shown). The discharge orifice 76 of main internal passageway 72 directs the ice particles produced therein toward the cutting edge 22 of insert 18 to produce the same affect as described above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof.

For example, the method and apparatus of machining described above employs the combination of water and liquid carbon dioxide to form a high velocity, low temperature stream including fluid particles in solid phase, i.e., ice crystal.. It is contemplated that fluids other than water and liquid carbon dioxide could be utilized in the practice of this invention. Additionally, the main conduit 30 could be mounted to the tool holder 10, positioned adjacent thereto as shown in FIGS. 1 and 2 or formed internally of a clamp 54 such as illustrated in FIG. 3. The exact form of the main conduit 30 is not critical and could include, in addition to a pipe, essentially any structure having a passageway for transmitting low temperature fluid particles in solid phase toward the cutting area.

Therefore, it is intended that the invention not be limited to the particular embodiment disclosed as the best mode contemplated for carrying out this invention, but that the invention will include all embodiments falling within the scope of the appended claims.

I claim:

1. A method of machining, comprising:
   contacting a workpiece with the cutting edge of an insert to shear material from the workpiece producing heat;
   combining one liquid with a different pressurized fluid in liquid phase to form a coolant stream including low temperature fluid particles in solid phase;
   directing said coolant stream including low temperature fluid particles in solid phase at high velocity toward the cutting edge of the insert and the workpiece to cool the workpiece.

2. The method of claim 1 in which said step of combining a liquid with a pressurized fluid in liquid phase further comprises:
   combining the liquid and the pressurized fluid in liquid phase at a pressure less than that required to maintain said pressurized fluid in liquid phase, said pressurized fluid vaporizing to convert said liquid into said coolant stream including low temperature fluid particles in solid phase.

3. The method of claim 1 in which said step of combining a liquid with a pressurized fluid in liquid phase further comprises:
   pumping said liquid with rapidly alternating high pressure pulses and low pressure pulses to form a pulsating stream of liquid;
   combining the pressurized fluid in liquid phase with said pulsating stream of liquid, said pulses of low pressure within said pulsating stream of liquid having a pressure less than that required to maintain said pressurized fluid in liquid phase, said pressurized fluid vaporizing to convert said pulsating stream of liquid into said coolant stream including low temperature fluid particles in solid phase.

4. The method of claim 1 further including the step of:
   converting said coolant stream including low temperature fluid particles in solid phase to a vapor upon exposure to the heat produced by shearing material from the workpiece, said fluid particles in solid phase undergoing a rapid volumetric expansion in forming a vapor.

5. The method of claim 4 further including the step of:
   impacting the workpiece with said vapor to shear material from the workpiece.

6. A method of extending the life of an insert in a machining operation, comprising:
   contacting the workpiece with the cutting edge of the insert to shear material from the workpiece producing heat;
   combining one liquid with a different pressurized fluid in liquid phase to form a coolant stream including low temperature fluid particles in solid phase;
   directing said coolant stream including low temperature fluid particles in solid phase at high velocity toward the cutting edge of the insert and the workpiece;
   converting said coolant stream including low temperature fluid particles in solid phase to a vapor exposure to the heat produced by shearing material from the workpiece, the conversion of said fluid particles from solid phase to a vapor drawing heat from the workpiece to lessen the transfer of heat between the workpiece and insert to prolong the life of the insert.

7. A method of machining a workpiece with an insert to remove material from the workpiece in minute granules, comprising:
   contacting the workpiece with a cutting edge of the insert to shear material from the workpiece producing heat;
   combining one liquid with a different pressurized fluid in liquid phase to form a coolant stream including low temperature fluid particles in solid phase;

directing said stream including low temperature fluid particles in solid phase at high velocity toward the cutting edge of the insert and the workpiece;

converting said coolant stream including low temperature fluid particles in solid phase to a vapor upon exposure to the heat produced by shearing material from the workpiece, said low temperature fluid particles in solid phase undergoing a rapid volumetric expansion in forming a vapor;

impacting the workpiece with said vapor to shear material therefrom and break up the material into minute granules.

8. A method of machining a workpiece comprising:

transmitting a stream of water at high velocity through a conduit having a discharge orifice;

combining liquid carbon dioxide with said stream of water within said conduit upstream from said discharge orifice;

converting the liquid carbon dioxide to vapor phase upon contact with said stream of water to form a coolant stream including low temperature ice particles within said conduit;

contacting the workpiece with a cutting edge of an insert to initially shear material from the workpiece which produces heat;

discharging said coolant stream including low temperature ice particles from the discharge orifice of said conduit at high velocity toward the cutting edge of the insert and the workpiece;

converting said coolant stream including low temperature ice particles to steam and carbon dioxide gas upon exposure to the heat produced by shearing material from the workpiece, said coolant stream including low temperature ice particles undergoing a rapid volumetric expansion in forming the steam and carbon dioxide gas;

impacting the workpiece with the steam and carbon dioxide gas to shear material from the workpiece and to break up the sheared material into minute granules.

9. The method of claim 8 in which said step of transmitting a stream of water at high velocity through a conduit comprises:

pumping the stream of water with rapidly alternating high pressure pulses and low pressure pulses to form a pulsating stream of water.

10. The method of claim 9 in which said step of combining liquid carbon dioxide with said stream of water comprises:

introducing liquid carbon dioxide into said conduit at constant pressure for combination with said pulsating stream of water, the pressure of said pulsating stream of water at said low pressure pulses being less than that required to maintain the liquid carbon dioxide in liquid phase so that the liquid carbon dioxide is vaporized within said conduit.

11. The method of claim 8 in which said step of converting the liquid carbon dioxide to vapor phase further includes accelerating said coolant stream including low temperature ice particles formed within said conduit by the volumetric expansion of the carbon dioxide in converting from liquid phase to vapor phase.

12. A method of machining, comprising:

contacting a workpiece with the cutting edge of an insert to initially shear material from the workpiece producing heat;

transmitting a stream of one liquid through a first conduit, said first conduit having a top portion, a bottom portion and a discharge orifice orientated toward the cutting edge of the insert and the workpiece;

transmitting a stream of a different, pressurized fluid in liquid phase through a second conduit, said second conduit being connected to said top portion of said first conduit upstream from said discharge orifice in said first conduit;

combining said pressurized fluid in liquid phase with said stream of said one liquid to form a coolant stream within said first conduit including low temperature fluid particles in solid phase, said coolant stream being formed with a temperature gradient wherein the temperature of said coolant stream increases from said top portion of said first conduit to said bottom portion thereof;

ejecting said coolant stream at high velocity from said discharge orifice of said first conduit toward the cutting edge of the insert and the workpiece to cool the workpiece.

13. The method of claim 12 in which said step of ejecting said coolant stream comprises ejecting said coolant stream such that the higher temperature portion of said coolant stream at said bottom portion of said first conduit is closest to the insert and the lower temperature portion of said coolant stream at said top portion of said first conduit is furthest from the insert.

* * * * *